(12) United States Patent
Haight et al.

(10) Patent No.: US 6,290,279 B1
(45) Date of Patent: Sep. 18, 2001

(54) INSERTABLE VEHICLE FLOOR DRAIN

(75) Inventors: Dayne Stuart Haight, Rochester Hills, MI (US); William Duncan McIntosh, Ontario (CA)

(73) Assignee: Collins & Aikman Product Corp., Charlotte, NC (US)

( * ) Notice: Subject to any disclaimer, the term of this patent is extended or adjusted under 35 U.S.C. 154(b) by 0 days.

(21) Appl. No.: 09/344,512

(22) Filed: Jun. 25, 1999

(51) Int. Cl.$^7$ ................................................ B62D 25/20
(52) U.S. Cl. ................ 296/97.23; 52/302.7; 220/235; 470/906
(58) Field of Search ............ 296/38, 39.1, 39.3, 296/97.23, 208; 220/235, 288; 52/302.1, 302.7; 470/906

(56) References Cited

U.S. PATENT DOCUMENTS

| 936,444 | * | 10/1909 | Gillon | 220/288 |
|---|---|---|---|---|
| 3,143,373 | * | 8/1964 | Fordyce | 296/107.01 |
| 4,071,273 | * | 1/1978 | Hack et al. | 296/208 |
| 4,092,745 | | 6/1978 | Oropallo | 4/288 |
| 4,620,330 | | 11/1986 | Izzi, Sr. | 4/288 |
| 4,944,612 | | 7/1990 | Abstetar et al. | 296/39.2 |
| 4,958,743 | * | 9/1990 | Hatton et al. | 220/288 |
| 4,978,004 | * | 12/1990 | Silverstein et al. | 206/224 |
| 5,426,993 | | 6/1995 | Bodo | 74/484 R |
| 5,527,081 | * | 6/1996 | Rauch et al. | 296/186 |
| 5,673,956 | * | 10/1997 | Emery | 296/39.2 |
| 5,709,309 | | 1/1998 | Gallagher et al. | 220/229 |
| 5,957,154 | * | 9/1999 | Olaker | 137/296 |

FOREIGN PATENT DOCUMENTS 9216455.2   3/1993  (DE) .
2111327   6/1972  (FR) .

* cited by examiner

Primary Examiner—Stephen T. Gordon
Assistant Examiner—Paul Chenevert
(74) Attorney, Agent, or Firm—Myers Bigel Sibley & Sajovec

(57) ABSTRACT

Floor drains are provided that can be inserted through floor coverings and through multiple floor panels of a vehicle body. An elongate hollow body terminates at an open distal end and at an open proximate end. A flange extends circumferentially around the open proximate end. One or more resilient members extend circumferentially around, and outwardly from, the body in adjacent spaced-apart relationship with the flange. The resilient members are configured to secure the floor drain within a vehicle floor panel such that the flange compressively engages the floor panel.

21 Claims, 3 Drawing Sheets

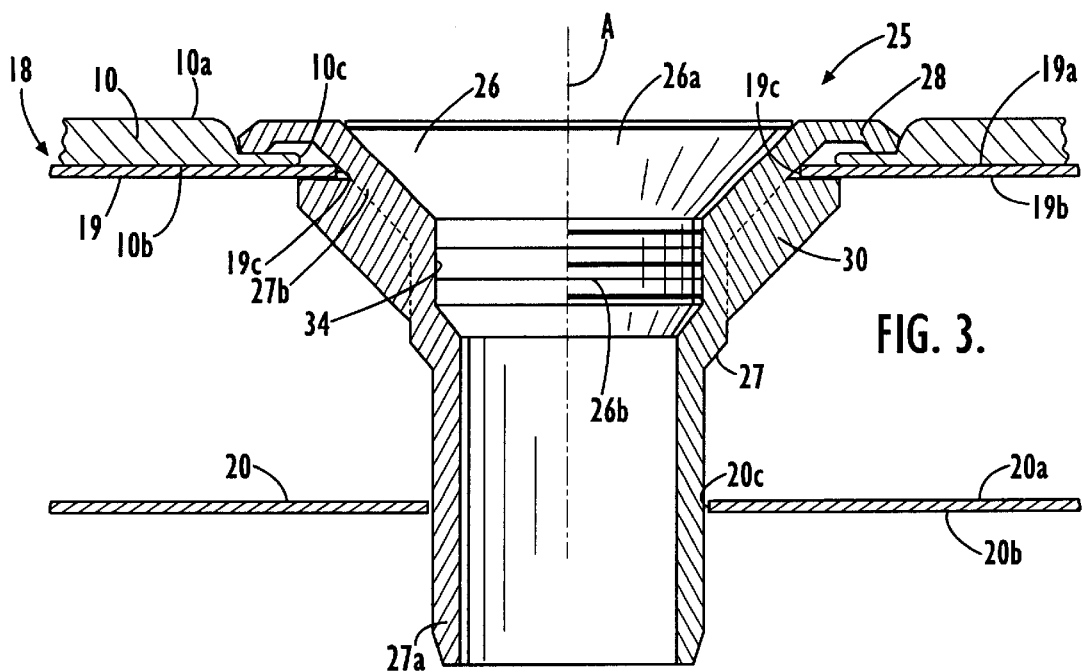
FIG. 3.
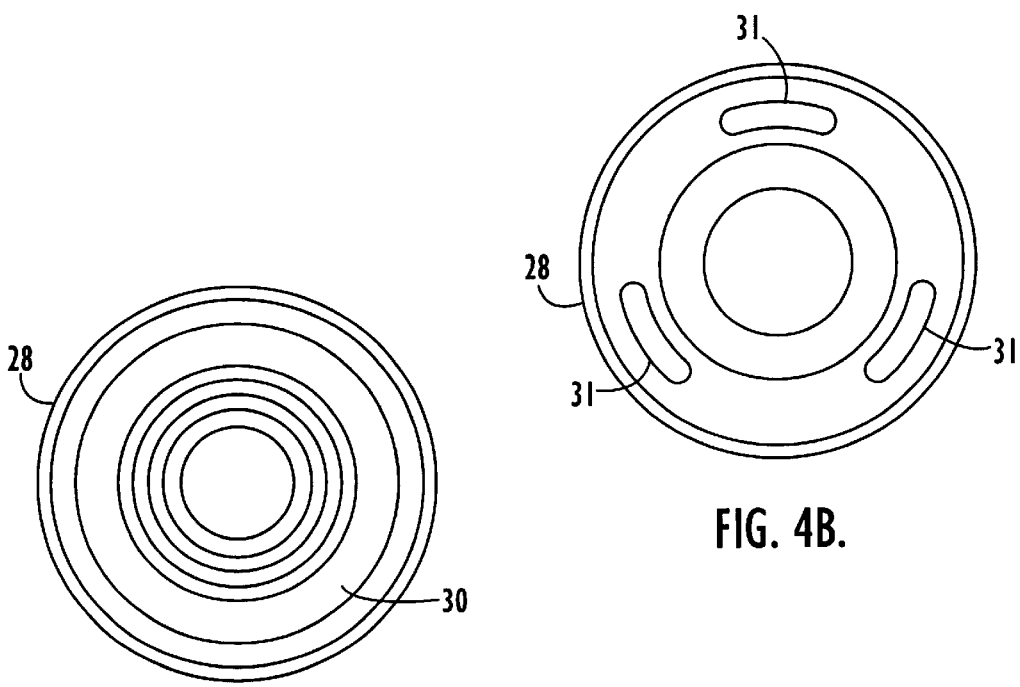
FIG. 4A.
FIG. 4B.

INSERTABLE VEHICLE FLOOR DRAIN

FIELD OF THE INVENTION

The present invention relates generally to vehicle floors and, more particularly, to drains for vehicle floors.

BACKGROUND OF THE INVENTION

Vehicle manufacturers typically provide some type of covering for vehicle floors. Vehicle floor coverings are typically configured to provide a resilient and decorative wearing surface with heat insulating and sound deadening qualities. For example, the use of carpet as a vehicle floor covering is well known. Carpeting used to cover a vehicle floor is typically molded into a contoured configuration that conforms to the contour of a vehicle floor so as to fit properly. U.S. Pat. No. 4,579,764 to Peoples, Jr., et al. discloses an exemplary molded foam-backed carpet for use as a vehicle floor covering.

The use of molded thermoplastic polymer compositions as floor coverings for vehicles known as sport utility vehicles (SUVs), which recently have found growing popularity among consumers, is also known. U.S. Pat. No. 5,322,335 to Niemi discloses an exemplary molded floor covering for an SUV.

It is known that water can accumulate on the floors of passenger and cargo compartments of vehicles, particularly during inclement weather. Because of the potential for corrosion and other damage that may be caused by such water accumulation, drain holes are conventionally provided within vehicle floors to enable any collected water to drain out. In order to prevent the infiltration of noise and dirt within a vehicle during vehicle operation, these drain holes are conventionally fitted with removable plugs.

Many conventional floor coverings, particularly floor coverings for SUVs, are formed from material that is impervious to water. As a result, water that accumulates on a vehicle floor covering may be prevented from draining from the vehicle via drains provided within the vehicle floor. Accordingly, there is a need for providing a mechanism that allows water to drain directly through vehicle floor coverings.

SUMMARY OF THE INVENTION

In view of the above, it is an object of the present invention to facilitate the removal of water from within a vehicle directly through a vehicle floor covering.

This and other objects of the present invention are provided by a vehicle floor drain that can be inserted through a floor covering and through upper and lower spaced apart floor panels of a vehicle body. Floor drains according to the present invention include a removable drain plug that can be removed to allow water standing on a vehicle floor covering to drain out.

A floor drain according to the present invention has an elongate hollow body that terminates at an open distal end and at an open proximate end. A flange extends circumferentially around the open proximate end. According to one embodiment of the present invention, a resilient lip extends circumferentially around, and outwardly from, the body in adjacent spaced-apart relationship with the flange. The resilient lip is configured to secure the floor drain within a vehicle upper floor panel such that the flange is maintained in compressive engagement with the upper floor panel.

According to another embodiment of the present invention, a plurality of resilient members extend outwardly from the body in adjacent spaced-apart relationship with the flange. The resilient members are configured to secure the floor drain within a vehicle upper floor panel such that the flange is maintained in compressive engagement with the upper floor panel.

According to another embodiment of the present invention, a plurality of resilient members extend circumferentially around, and outwardly from, the body adjacent the body distal end. Each resilient member is configured to frictionally engage the lower floor panel through which the body distal end extends. The floor drain is thereby secured within the vehicle lower floor panel such that the flange is maintained in compressive engagement with the upper floor panel.

The body proximate end has a shape that is configured to receive a correspondingly-shaped head of the drain plug in countersunk relation therewith. The body also includes a threaded cylindrical bore that defines an axial direction. The drain plug includes a head and a threaded shank connected to the head and is configured to be inserted within the threaded bore. The threaded shank is configured to threadingly engage the threaded bore such that the drain plug can be inserted and removed via rotation about the axial direction.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 3 is a side section view of the floor drain of FIG. 2 installed within a vehicle floor and having the drain plug in a secured position within the drain tube.

FIG. 4A is a bottom section view of the floor drain of FIG. 3 illustrating a resilient lip extending circumferentially around, and outwardly from, the body in adjacent spaced-apart relationship with the flange.

FIG. 4B is a bottom section view of the floor drain of FIG. 3 having resilient members extending outwardly from the body in adjacent spaced-apart relationship with the flange.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
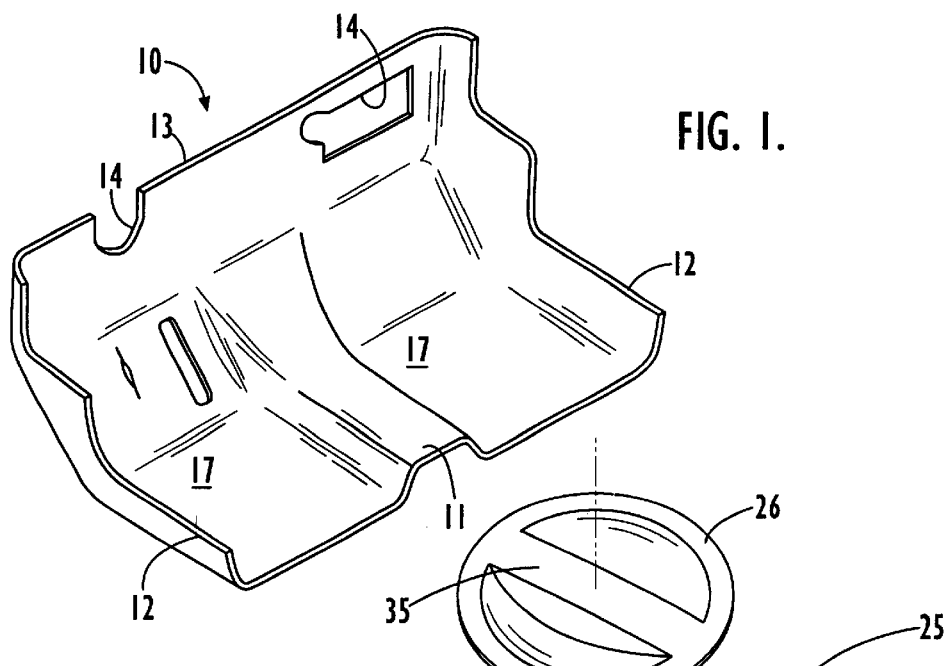
FIG. 1 is a perspective view showing an exemplary molded floor covering assembly for a vehicle incorporating an integral drain in accordance with the invention.

Referring now specifically to FIG. 1, reference character 10 generally indicates a floor covering for a vehicle floor in which floor drains according to various embodiments of the present invention may be installed. The floor covering 10 illustrated in FIG. 1 has a nonplanar three dimensional molded configuration adapted to fit the front seat compartment floor of a vehicle and includes a raised medial portion 11 adapted to conform to the transmission hump, generally vertically extending side portions 12 adapted to fit beneath each door opening, and a front portion 13 adapted to fit along the inclined floorboard and vertical firewall areas of a vehicle. Various openings or cut-outs are provided, as indicated at 14, to receive air conditioning equipment, the steering column, pedals and the like. It is to be understood that the particular three dimensional configuration illustrated is merely for purposes of illustration. Vehicle floor coverings incorporating floor drains according to the embodiments of the present invention may have various configurations and shapes depending on the floor configuration of a vehicle.

Figure 2:
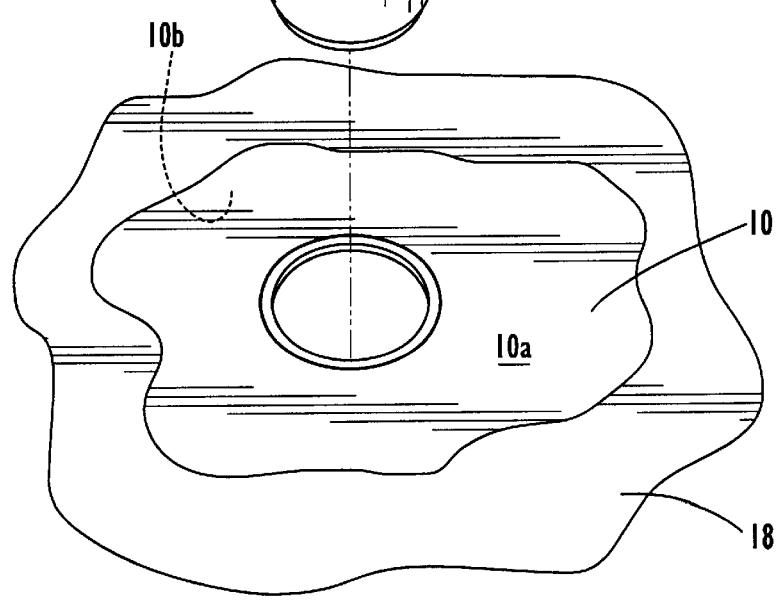
FIG. 2 is an exploded, perspective view of a floor drain and plug configured to be installed in the floor of a vehicle, according to an embodiment of the present invention.

Referring now to FIG. 2, an exploded, perspective view of a vehicle floor drain 25 according to an embodiment of the present invention is illustrated. The illustrated floor drain 25 is configured to be installed within low point areas (17, FIG. 1) of a vehicle floor 18 having a covering 10 thereon. The illustrated floor drain 25 includes a removable drain plug 26. By removing the drain plug 26, water standing on the vehicle floor covering can be removed through the floor drain 25.

FIG. 3 is a side section view of the floor drain 25 of FIG. 2 in an installed configuration. A vehicle floor 18 includes first and second adjacent floor panels 19, 20 in spaced-apart relationship. The first floor panel 19 has opposite surfaces 19a, 19b and an aperture 19c formed therethrough. The second floor panel 20 has opposite surfaces 20a, 20b and an aperture 20c formed therethrough. In the installed configuration, the floor drain 25 extends through both the aperture 19c in the first panel 19 and the aperture 20c in the second panel 20.

The floor covering 10 has opposite surfaces 10a, 10b and an aperture 10c formed therethrough as illustrated. The floor covering 10 is disposed on the first panel 19 such that the first panel surface 19a and the floor covering surface 10b are in contacting face-to-face relationship. As would be understood by one of skill in the art, the floor covering 10 may be secured to the vehicle floor first panel 19 via adhesives and/or fasteners. As illustrated, the floor covering aperture 10c is aligned with the aperture 19c in the first panel 19 such that the floor drain 25 can be inserted therethrough.

The illustrated floor drain 25 has an elongate hollow body 27 that terminates at an open distal end 27a and an open proximate end 27b. A flange 28 extends circumferentially around the open proximate end 27b as illustrated. The illustrated proximate end 27b has a conical frustum shape that is configured to receive a correspondingly-shaped head 26a of the drain plug 26 in countersunk relation therewith. The distal end 27a is configured to extend through the aperture 20c in the second panel 20 of the vehicle floor 18.

One or more resilient members 30 extend outwardly from the body 27 in adjacent spaced apart relationship with the flange 28. The one or more resilient members 30 serve as means for securing the floor drain 25 within the vehicle floor first panel 19 such that the flange 28 is retained in compressive contact with the vehicle floor 18 and floor covering 10.

As illustrated in FIG. 4A, the one or more resilient members 30 are embodied as a resilient lip that extends circumferentially around, and outwardly from, the body 27 in adjacent spaced-apart relationship with the flange 28. The resilient lip 30 is configured to secure the floor drain 25 within the floor first panel 19 by engaging the first panel surface 19b around the periphery of the aperture 19c. When the floor drain 25 is inserted within the first panel aperture 19c, the resilient lip 30 elastically deforms to allow the flange 28 to compressively engage the floor covering 10 adjacent the floor covering aperture 10c. Once the floor drain 25 is seated within the vehicle floor 18, the resilient lip 30 springs back from its deformed state and engages the first panel surface 19b around the periphery of the first panel aperture 19c.

In the embodiment illustrated in FIG. 4B, a plurality of circumferentially spaced apart resilient members 31 extend outwardly from the body 27 in adjacent spaced-apart relationship with the flange 28. The resilient members 31 are configured to secure the floor drain 25 within the floor first panel 19 by engaging the first panel surface 19b around the periphery of the aperture 19c. When the floor drain 25 is inserted within the first panel aperture 19c, the resilient members 31 elastically deform to allow the flange 28 to compressively engage the floor covering 10 adjacent the floor covering aperture 10c. Once the floor drain 25 is seated within the vehicle floor 18, the resilient members 31 spring back from their deformed state and engage the first panel surface 19b around the periphery of the first panel aperture 19c.

Figure 5:
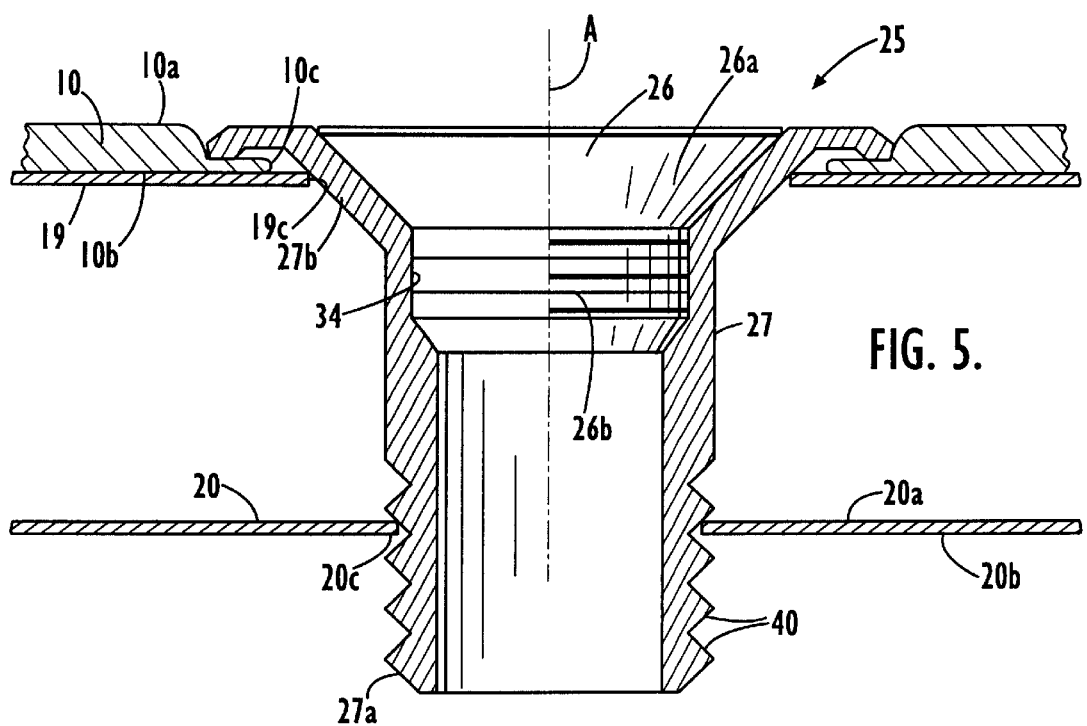
FIG. 5 is a side section view of a floor drain according to the present invention installed within a vehicle floor wherein the distal end is secured to a vehicle lower floor panel.

Another embodiment of the floor drain 25 of FIG. 3 is illustrated in FIG. 5. A plurality of spaced apart resilient members 40 extend circumferentially around, and outwardly from the body 27 adjacent the body distal end 27a. Each resilient member 40 is configured to frictionally engage the second floor panel 20 around the periphery of the second panel aperture 20c. When the floor drain 25 is inserted within the first and second panel apertures 19c, 20c, the resilient members 40 grip the second floor panel 20 such that the floor drain 25 is secured within the first and second floor panels 19, 20 and such that the flange 28 is compressively engaged with the floor covering 10 adjacent the floor covering aperture 10c.

The illustrated floor drain 25 of FIGS. 3–5 also includes a threaded cylindrical bore 34 that defines an axial direction A. The drain plug 26 includes a head 26a and a threaded shank 26b connected to the head 26a. The threaded shank 26b is configured to threadingly engage the threaded cylindrical bore 34 for moving the head 26a of the drain plug 26 along the axial direction A toward and away from the proximate end 27a when the drain plug 26 is rotated about the axial direction A in respective opposite directions.

Preferably, rotation of the drain plug 26 in a clockwise direction causes the drain plug 26 to move along the axial direction A so that the drain plug head 26a moves towards the proximate end 27b. Conversely, rotation of the drain plug 26 in a counter-clockwise direction causes the drain plug 26 to move along the axial direction A so that the drain plug head 26a moves away from the proximate end 27b.

Referring back to FIG. 2, the illustrated drain plug head 26a includes a portion (e.g., a handle) 35 that is configured to be grasped by a user for manually rotating the drain plug about the axial direction A. Alternatively, the handle 35 may be grasped by a tool that is configured to rotate the drain plug 26 about the axial direction A. However, it is understood that the drain plug head 26a may have various configurations and is not limited to the illustrated embodiment. For example, projections extending from the drain plug head 26a may serve as means for engaging a tool that is configured to rotate the drain plug head 26a.

The floor drain 25 and drain plug 26 may be formed from various materials including, but not limited to, metals, plastics and rubber. Preferably, the drain plug 26 is formed from plastic or rubber to facilitate easy removal by hand without the need for a removal tool.

The drain plug head 26a has a conical frustum shape. Accordingly, when the drain plug 26 is secured within the floor drain body 27, the drain plug head 26a is countersunk within the proximate end 27b such that the drain plug head 26a is substantially flush with the exposed surface 10a of the floor covering, as illustrated in FIG. 3.

FIG. 3 illustrates the drain plug 26 in a secured position within the cylindrical bore 34. To remove water that has accumulated on the floor covering exposed surface 10a, the drain plug 26 is preferably rotated in a counter-clockwise direction which threadingly disengages the threaded shank 26b from the threaded bore 34, thereby allowing the drain plug 26 to be removed from the floor drain 25. The accumulated water can then drain from the vehicle into the open proximate end 27b, through the hollow body 27 and out the open distal end 27a. After the water is drained from the vehicle, the drain plug 26 is preferably returned to a secured position within the floor drain 25 as illustrated in FIG. 3.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A vehicle floor drain apparatus, comprising:
    an elongate hollow body terminating at an open distal end and an open proximate end and including
        a threaded cylindrical bore that defines an axial direction;
        a flange extending circumferentially around the open proximate end,
        at least one resilient member extending circumferentially around and outwardly from the body adjacent the body distal end, wherein each at least one resilient member is configured to frictionally engage a vehicle floor when the body is inserted within an aperture in the vehicle floor, such that the flange is retained in compressive contact with the vehicle floor adjacent the aperture; and
    a drain plug including a head and a threaded shank connected to the head, wherein the threaded shank is configured to threadingly engage the threaded cylindrical bore for moving the head of the drain plug along the axial direction toward and away from the hollow body proximate end when the drain plug is rotated about the axial direction in respective opposite directions.

2. A vehicle floor drain apparatus according to claim 1 wherein the drain plug head has a conical frustum shape and wherein the body proximate end has a corresponding conical frustum shape that is configured to receive the drain plug head in countersunk relation therewith.

3. A vehicle floor drain apparatus according to claim 1 wherein the drain plug head comprises a portion configured to be engaged by a tool for rotating the drain plug about the axial direction.

4. A vehicle floor drain apparatus according to claim 1 wherein the drain plug head comprises a portion configured to be grasped by a user for manually rotating the drain plug about the axial direction.

5. A vehicle floor drain apparatus, comprising:
    an elongate hollow body terminating at an open distal end and an open proximate end and including a threaded cylindrical bore that defines an axial direction;
    a flange extending circumferentially around the open proximate end;
    a plurality of circumferentially spaced apart resilient members extending outwardly from the body in adjacent spaced apart relationship with the flange, wherein the resilient members are configured to secure the body within an aperture in a vehicle floor such that the flange is retained in compressive contact with the vehicle floor adjacent the aperture; and
    a drain plug including a head and a threaded shank connected to the head, wherein the threaded shank is configured to threadingly engage the threaded cylindrical bore for moving the head of the drain plug along the axial direction toward and away from the body proximate end when the drain plug is rotated about the axial direction in respective opposite directions, wherein the drain plug head has a conical frustum shape, and wherein the body proximate end has a corresponding conical frustum shape that is configured to receive the drain plug head in countersunk relation therewith.

6. A vehicle floor drain apparatus according to claim 5 wherein the drain plug head comprises a portion configured to be engaged by a tool for rotating the drain plug about the axial direction.

7. A vehicle floor drain apparatus according to claim 5 wherein the drain plug head comprises a portion configured to be grasped by a user for manually rotating the drain plug about the axial direction.

8. A vehicle floor drain apparatus, comprising:
    an elongate hollow body terminating at an open distal end and an open proximate end and including a threaded cylindrical bore that defines an axial direction;
    a flange extending circumferentially around the open proximate end;
    at least one resilient member extending circumferentially around and outwardly from the hollow body adjacent the hollow body distal end, wherein each at least one resilient member is configured to frictionally engage the vehicle floor and to secure the body within an aperture in the vehicle floor such that the flange is retained in compressive contact with the vehicle floor adjacent the aperture; and
    a drain plug including a head and a threaded shank connected to the head, wherein the threaded shank is configured to threadingly engage the threaded cylindrical bore for moving the head of the drain plug along the axial direction toward and away from the body proximate end when the drain plug is rotated about the axial direction in respective opposite directions, wherein the drain plug head has a conical frustum shape, and wherein the body proximate end has a corresponding conical frustum shape that is configured to receive the drain plug head in countersunk relation therewith.

9. A vehicle floor drain apparatus according to claim 8 wherein the drain plug head comprises a portion configured to be engaged by a tool for rotating the drain plug about the axial direction.

10. A vehicle floor drain apparatus according to claim 8 wherein the drain plug head comprises a portion configured to be grasped by a user for manually rotating the drain plug about the axial direction.

11. A vehicle body, comprising:
a first floor panel comprising opposite first and second surfaces, and a first aperture formed therethrough;
a covering disposed on the first surface of the first floor panel, wherein the covering has a second aperture formed therethrough, and wherein the second aperture is in communication with the first aperture; and
a floor drain apparatus disposed within the first and second apertures. comprising:
an elongate hollow body terminating at an open distal end and an open proximate end and including a threaded cylindrical bore that defines an axial direction;
a flange extending circumferentially around the open proximate end;
a plurality of circumferentially spaced apart resilient members extending outwardly from the hollow body in adjacent spaced apart relationship with the flange, wherein a portion of the first floor panel and covering are configured to be secured between the flange and the resilient members such that the flange is retained in compressive contact with the covering adjacent the second aperture; and
a drain plug including a head and a threaded shank connected to the head, wherein the threaded shank is configured to threadingly engage the threaded cylindrical bore for moving the head of the drain plug along the axial direction toward and away from the body proximate end when the drain plug is rotated about the axial direction in respective opposite directions, wherein the drain plug head has a conical frustum shape, and wherein the body proximate end has a corresponding conical frustum shape that is configured to receive the drain plug head in countersunk relation therewith.

12. A vehicle body according to claim 11 further comprising a second floor panel in spaced apart adjacent relationship with the first floor panel, wherein the second floor panel includes a third aperture formed therethrough, wherein the body distal end extends through the third aperture, and further comprising at least one resilient member extending circumferentially around, and outwardly from, the body adjacent the body distal end, wherein each at least one resilient member is configured to frictionally engage the second floor panel adjacent the third aperture.

13. A vehicle body according to claim 11 wherein the drain plug head comprises a portion configured to be engaged by a tool for rotating the drain plug about the axial direction.

14. A vehicle body according to claim 11 wherein the drain plug head comprises a portion configured to be grasped by a user for manually rotating the drain plug about the axial direction.

15. A vehicle body according to claim 11 wherein the floor covering comprises a thermoplastic polymer.

16. A vehicle body according to claim 15 wherein the thermoplastic polymer comprises an ethylene/vinyl acetate copolymer.

17. A vehicle body, comprising:
a first floor panel comprising opposite first and second surfaces, and a first aperture formed therethrough;
a second floor panel in spaced apart adjacent relationship with the first floor panel, wherein the second floor panel includes a third aperture formed therethrough;
a covering disposed on the first surface of the first floor panel, wherein the covering has a second aperture formed therethrough, and wherein the second aperture Is in communication with the first aperture; and
a floor drain apparatus disposed within the first, second, and third apertures, comprising:
an elongate hollow body terminating at an open distal end and an open proximate end and including a threaded cylindrical bore that defines an axial direction;
a flange extending circumferentially around the open proximate end;
at least one resilient member extending circumferentially around, and outwardly from, the body adjacent the body distal end, wherein each at least one resilient member is configured to frictionally engage the second floor panel adjacent the third aperture such that the flange is retained in compressive contact with the covering adjacent the second aperture; and
a drain plug including a head and a threaded shank connected to the head, wherein the threaded shank is configured to threadingly engage the threaded cylindrical bore for moving the head of the drain plug along the axial direction toward and away from the body proximate end when the drain plug is rotated about the axial direction in respective opposite directions, wherein the drain plug head has a conical frustum shape, and wherein the body proximate end has a corresponding conical frustum shape that is configured to receive the drain plug head in countersunk relation therewith.

18. A vehicle body according to claim 17 wherein the drain plug head comprises a portion configured to be engaged by a tool for rotating the drain plug about the axial direction.

19. A vehicle body according to claim 17 wherein the drain plug head comprises a portion configured to be grasped by a user for manually rotating the drain plug about the axial direction.

20. A vehicle body according to claim 17 wherein the floor covering comprises a thermoplastic polymer.

21. A vehicle body according to claim 20 wherein the thermoplastic polymer comprises an ethylene/vinyl acetate copolymer.

* * * * *